(12) United States Patent
Mutschlechner et al.

(10) Patent No.: US 7,806,445 B2
(45) Date of Patent: Oct. 5, 2010

(54) SPIGOT-AND-SOCKET JOINT

(75) Inventors: Hermann Mutschlechner, Rum (AT); Reinhold Maurer, Innsbruck (AT)

(73) Assignee: Tiroler Roehren- und Metallwerke AG, Hall in Tirol (AT)

( * ) Notice: Subject to any disclaimer, the term of this patent is extended or adjusted under 35 U.S.C. 154(b) by 0 days.

(21) Appl. No.: 12/336,793

(22) Filed: Dec. 17, 2008

(65) Prior Publication Data

US 2009/0152866 A1 Jun. 18, 2009

Related U.S. Application Data

(63) Continuation of application No. PCT/EP2007/005729, filed on Jun. 28, 2007.

(30) Foreign Application Priority Data

Jun. 30, 2006 (DE) ........................ 10 2006 031 582

(51) Int. Cl.
*F16L 21/00* (2006.01)
(52) U.S. Cl. .................... 285/374; 285/376; 285/81
(58) Field of Classification Search ................ 285/377, 285/376, 374, 401, 400
See application file for complete search history.

(56) References Cited

U.S. PATENT DOCUMENTS

| | | | | |
|---|---|---|---|---|
| 136,328 | A | * 2/1873 | Lewis | 285/87 |
| 514,055 | A | * 2/1894 | Barnard | 285/88 |
| 1,291,376 | A | * 1/1919 | Berry | 285/107 |
| 1,588,444 | A | 6/1926 | Carson | |
| 1,911,659 | A | * 5/1933 | Weaver | 277/622 |
| 2,165,163 | A | * 7/1939 | Waters | 285/91 |
| 2,258,135 | A | * 10/1941 | Curtis | 277/621 |
| 2,538,683 | A | * 1/1951 | Guiler et al. | 277/626 |
| 2,647,768 | A | * 8/1953 | Exton | 285/84 |
| 2,935,342 | A | * 5/1960 | Seamark | 285/90 |
| 3,185,504 | A | 5/1965 | Perrot et al. | |
| 3,480,302 | A | * 11/1969 | Teague et al. | 285/362 |
| 3,498,642 | A | * 3/1970 | Berger | 285/189 |
| 3,520,541 | A | * 7/1970 | Rohani | 285/379 |
| 3,744,806 | A | * 7/1973 | Keyser | 285/230 |
| 3,751,078 | A | * 8/1973 | O'Brian et al. | 285/339 |

(Continued)

FOREIGN PATENT DOCUMENTS

DE    1 801 013    6/1969

(Continued)

*Primary Examiner*—David E Bochna
(74) *Attorney, Agent, or Firm*—Harness, Dickey & Pierce, P.L.C.

(57) ABSTRACT

A spigot-and-socket joint for connecting two pipes, comprising a socket end assigned to one pipe and into which a spigot end of the other pipe, which has a support strip, can be inserted and which has a radially inward-protruding edge with at least one ring segment-shaped recess, and a locking device for locking the spigot end in the socket end. The support strip rests against the locking device and the locking device rests against the edge. The locking device comprises at least two ring segment-shaped locking elements. At least four recesses are provided and are arranged with uniform spacing circumferentially, and the two locking elements each have two ring segment-shaped locking parts which are joined together via a respective web. The spacing between the two locking parts of a locking element corresponds to the spacing between two recesses.

16 Claims, 4 Drawing Sheets

U.S. PATENT DOCUMENTS

| | | | |
|---|---|---|---|
| 4,033,613 A * | 7/1977 | Bram | 285/184 |
| 4,540,204 A | 9/1985 | Battle et al. | |
| 7,509,724 B2 * | 3/2009 | Corbett et al. | 29/451 |
| 7,604,263 B2 * | 10/2009 | Mori et al. | 285/376 |

FOREIGN PATENT DOCUMENTS

| | | |
|---|---|---|
| DE | 33 36 855 A1 | 4/1985 |
| DE | 199 18 717 C1 | 1/2001 |
| DE | 101 61 144 A1 | 6/2003 |
| DE | 103 06 316 A1 | 8/2004 |
| DE | 103 40 946 B3 | 12/2004 |
| EP | 0 141 276 | 5/1985 |
| EP | 1 460 325 A2 | 9/2004 |
| GB | 1 223 575 | 2/1971 |

* cited by examiner

SPIGOT-AND-SOCKET JOINT

CROSS REFERENCES TO RELATED APPLICATIONS

This application is a continuation of copending international patent application PCT/EP2007/005729 filed on Jun. 28, 2007 and designating the U.S., which claims priority of German patent application DE 10 2006 031 582.0 filed on Jun. 30, 2006. The entire contents of these documents are incorporated herein by reference.

BACKGROUND OF THE INVENTION

The present invention relates to a spigot-and-socket joint for connecting two pipes, pipe fittings or the like, comprising a socket end which is assigned to one pipe and into which a spigot end of the other pipe, which has a support strip, can be inserted and which has a radially inward-protruding edge with at least one ring segment-shaped recess, and a locking device for locking the spigot end in the socket end, in that the support strip rests against the locking device and said locking device rests against the edge, the locking device comprising at least two ring segment-shaped locking elements.

Spigot-and-socket joints of the aforementioned type are known for example from document DE 199 187 17 C1. They serve to produce a rubber-sealed connection between two pipes which are usually under pressure. For tensile securing, these known spigot-and-socket joints have locking devices which prevent the spigot end of one pipe from being extracted from the socket end of the other pipe.

A locking device of this type comprises two locking elements or bars which are made of metal and each have at one end a projection (stop elements) serving as a stop.

To attain a spigot-and-socket joint, the spigot end is first inserted into the socket end until it strikes against the socket base. Subsequently, one bar is inserted into the socket recess and displaced in the clockwise direction until the projection strikes against the edge of the recess. The bar rests in this position in the radial direction against the spigot end of the pipe and in the axial direction, on the one hand, against the support strip and, on the other hand, against the inside of the edge of the socket end.

Subsequently, the second bar is also inserted into the recess of the socket end and displaced in the anticlockwise direction until the projection strikes against an edge of the recess. This bar also rests, both in the radial and in the axial direction, in the same manner as the first bar.

Although this spigot-and-socket joint has proven highly successful in practice, there is still the need to improve both the handling and the operation, and also to reduce the manufacturing costs.

Document DE 33 36 855 A1 also discloses a locked, plug-in connection for pipes, in particular socket pipes. In the case of this solution there is provided in the socket, before a ring seal viewed from the socket end, an annular recess, of which the portion that is directed toward the socket end is delimited by a conical surface and in which is arranged at least one locking part which rests radially on the conical surface and with a cylindrical support surface on a spigot end introduced into the socket and also axially on the conical surface and against a retaining collar surrounding the spigot end. The locking element or elements is/are inserted via a single opening and have to be oriented, wherein in practice the locking elements can then be secured in the oriented position by means of a tightening strap. Depending on the nominal width, a large number of locking elements can be inserted, although this system is in practice available only from a nominal width of DN 700.

Overall, the handling of the locking elements, in particular the inserting and orienting thereof, is complex.

SUMMARY OF THE INVENTION

Against this background, the object of the present invention is to develop the spigot-and-socket joint of the type mentioned at the outset in such a way that handling is simplified, the manufacturing costs are reduced and operational reliability is increased.

The object underlying the invention is achieved in that at least four recesses are provided and are arranged with uniform spacing in the circumferential direction and in that the two locking elements each have two ring segment-shaped locking parts which are joined together via a respective web, the spacing between the two locking parts of a locking element corresponding to the spacing between two recesses.

In other words, that means that the locking device has two identically embodied locking elements, of which the in total four locking parts rest with uniform spacing in the circumferential direction of the socket end. This has the advantage that the distribution of the stresses in the socket is rendered uniform and a reduction in the wall thickness thus becomes possible or a higher degree of protection against bursting of the socket or reduced ovalization of the pipe is attained.

The identical configuration of the locking elements, in contrast to the previous "left" and "right" bars, leads to the advantage that the manufacturing costs can be lowered. In addition, on-site handling is simplified, as the same components can be used. Finally, on-site handling is further improved as a result of the availability of four recesses for inserting the locking elements and not just one opening as in the previous solution.

A further advantage of the locking elements used is that the pipe inserted into the socket end can be tilted/bent more easily; this is achieved in particular as a result of the uniform arrangement of the locking elements. In addition, the centering of the joint in the socket is also improved.

A further advantage of the solution according to the invention is that the web does not restrict the tiltability, as it is at all times positioned in one of the recesses. In the case of the aforementioned prior art (DE 33 36 885), the web of the locking element adversely affects, i.e. reduces, the tiltability. The tiltability of the joint is in the case of the solution according to the invention, for example at the nominal width DN 200, approx. 6° to 8°, whereas in the system mentioned in the document it is at most 4°. The greater tiltability allows the number of fittings in the wiring to be reduced.

Finally, the spigot-and-socket joint according to the invention has the advantage that the longitudinal forces are distributed more uniformly onto the pipe surface so that it is possible, with the same wall thickness, to accommodate higher pressures or a specific pressure at a lower wall thickness than in the past. Thus, for example, the high-pressure bar could be dispensed with at high pressures.

In a preferred development, a retaining element is assigned to each locking element.

This retaining element serves to prevent the locking elements from rotating in the socket end, so that the locking elements cannot fall out.

In a preferred development, the retaining element lies parallel to the web between the two locking parts and rests against the edge, thus preventing rotation of the locking element in the socket end.

This configuration has the advantage that rotation can be prevented in a simple manner. Furthermore, the retaining element rests on the web and is prevented from falling out by the lug.

In a preferred development, the retaining element is made of a plastics material, preferably EPDM (ethylene propylene terpolymer). Making the retaining element of plastics material is advantageous in particular from the point of view of costs. The use of EPDM has the advantage that this material on the one hand has the necessary flexibility to be able to guide the retaining element beyond the lug and on the other hand is exceptionally resistant to oxygen, ozone and also further external atmospheric influences; this is very important specifically in the case of earth-laid pressure pipes.

In a preferred development, the locking elements are made of metal, preferably of a cast material, for example a ductile cast iron, or a pressure-resistant plastics material.

This has the advantage that, owing to the strength of the material, high tensile and compressive forces can be accommodated.

In a preferred development, the web extends in the direction of the longitudinal axis (longitudinal axis of the pipe and the socket end) and has at its end a lug which extends in the radial direction (with respect to the pipe and the socket end) and lies parallel to the longitudinal axis, the lug being—when the locking parts are inserted—outside the socket end.

This technical configuration has proven particularly advantageous in practice, handling being simplified in particular. The locking element can retain very effectively on the lug, be inserted into the socket end and subsequently displaced into the desired position.

In a preferred development, the socket end has on its inside a semicircular groove encircling in the circumferential direction and a circumferential surface which adjoins said groove and runs obliquely to the longitudinal axis, the groove and the circumferential surface being provided to receive a correspondingly embodied ring seal. Preferably, the ring seal has a first longitudinal portion, which has an outwardly rounded surface which is adapted to the groove, and a second longitudinal portion which is embodied in a dovetailed manner, the first longitudinal portion serving as the retaining part and the second longitudinal portion as the sealing part.

These measures have proven particularly advantageous in practice. The round shape of the retaining part of the ring seal allows better coating of the surface and easier insertion into the groove. In addition, there is on the ring seal an extended straight end face which serves to improve supporting in the event of high internal pressures. Finally, the sealing part has a pronounced sealing lip which achieves better pressing against the socket inner surface or the pipe surface and in addition facilitates and improves the tiltability of the spigot-and-socket joint. Finally, the ring seal according to the invention provides a reduction in the assembly forces as a result of the lower inclination of the inner sealing lip.

In a preferred development, both the outwardly pointing and the inwardly pointing surface of the ring seal are—viewed in longitudinal section—concave in their embodiment. In the case of a further preferred configuration, the ring seal has a spring running in the circumferential direction in the region of the first longitudinal portion. Preferably, this spring is vulcanized into the ring seal.

Furthermore, the edge has a beveled inner ring surface 24, the angle between the ring surface and longitudinal axis of the socket end being approximately 30°. The aforementioned measures lead to further advantages. The selected angle of the inner ring surface of 30° allows the stresses at the pipe end and in the socket to be divided more effectively and the overall length of the shearing protection chamber can be reduced. The specific configuration of the ring seal, in particular the specific geometry thereof, allows a marked reduction in the required assembly forces relative to the conventional systems. Furthermore, it is possible additionally to lubricate the inside of the socket in order further to reduce the assembly forces; this is not possible in the case of the system described in the abovementioned document DE 33 36 855, as in this case the ring seal is drawn out of its seat.

As a result of the specific geometry of the head, the spigot-and-socket joint is tight to external pressure of at least 10 bar.

Preferably, the ring seal consists solely of a material component having a Shore hardness of 55. The ring seals used in the prior art usually have a hard part (head) and a soft part (sealing region); this can lead to problems in the case of unfavorable pairings of the dimensional tolerances. The vulcanized-in spring element allows the ring seal according to the invention to accommodate high loads.

The object underlying the invention is also achieved by a ring seal for an aforementioned spigot-and-socket joint that has the features described hereinbefore. In other words, that means that the present invention also relates individually to a ring seal, independently of the spigot-and-socket joint according to the invention.

Further advantages and configurations of the invention emerge from the description and the accompanying drawings.

It will be understood that the features which have been hereinbefore and will be described hereinafter can be used not only in the respectively specified combination, but rather also in other combinations or in isolation, without departing from the scope of the present invention. In particular, it should be noted at this point that the ring seal can also be used on its own without the spigot-and-socket joint.

BRIEF DESCRIPTION OF THE DRAWINGS

The invention will now be described in greater detail based on an exemplary embodiment and with reference to the drawings, in which.

DETAILED DESCRIPTION OF PREFERRED EMBODIMENTS

Figure 1:
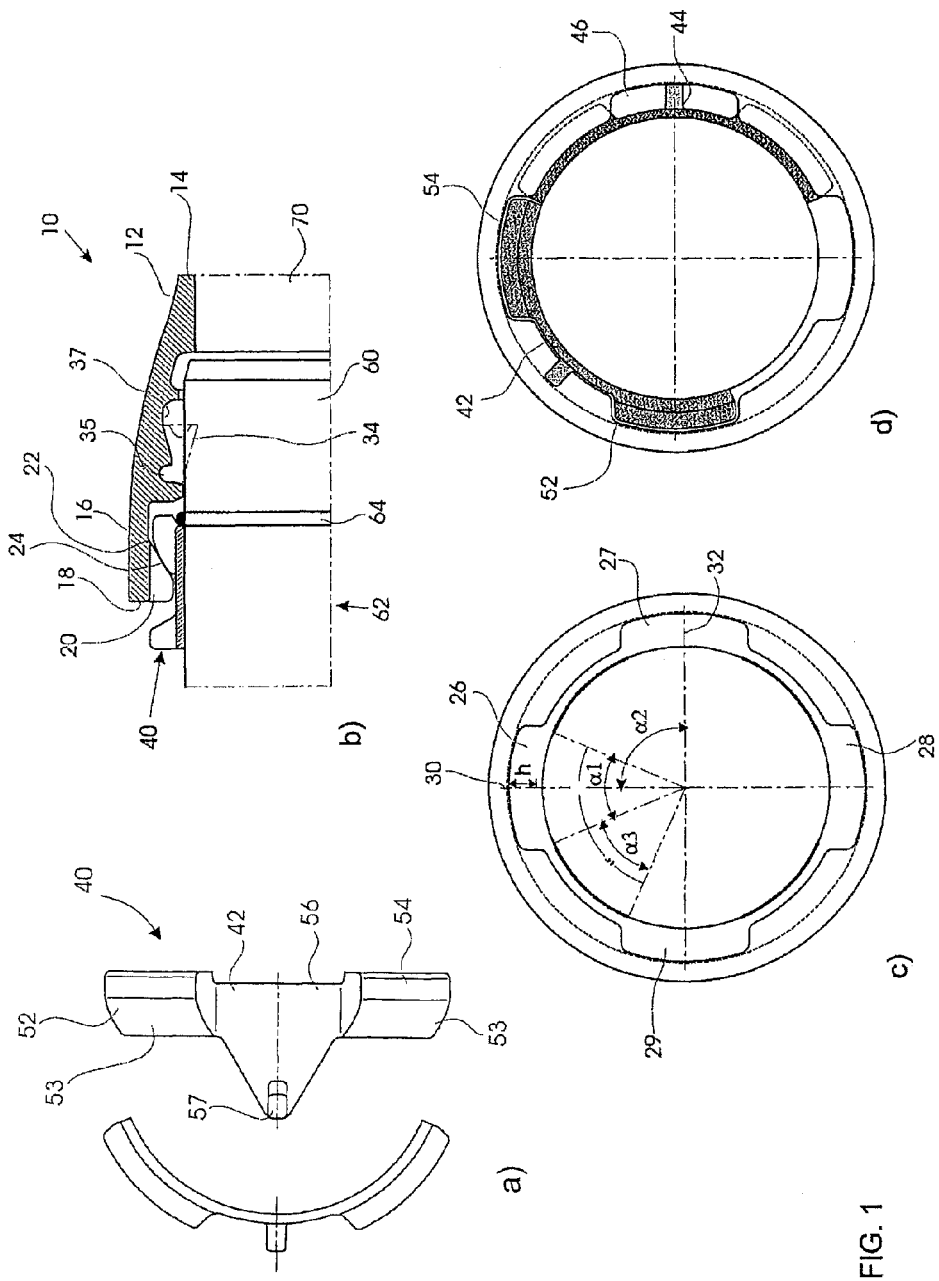
FIGS. 1a to d are schematic views of a spigot-and-socket joint.

In FIGS. 1a to d, in particular FIG. 1b, a spigot-and-socket joint is shown and denoted by reference numeral 10. This spigot-and-socket joint 10 comprises a socket piece 12 which either is an integral part of a pipe 14 or can be connected to a pipe 14 of this type. For the sake of simplicity, all references hereinafter will be to a pipe. It will be understood that, instead of the pipe 14, a fitting or the like can obviously also be used. The socket piece 12 has a longitudinal portion which is referred to as the socket end 16 and has an enlarged internal diameter compared to the internal diameter of the pipe 14. The socket end 16 has at its front 18 a flange-type edge 20 which extends inward in the radial direction by a length h. This edge 20 is embodied in a flat manner at the front 18, while it extends conically at the inside 22, so that the internal diameter of the edge 20 at the front 18 is smaller than the internal diameter of the edge 20 on the inside 22. An inner ring surface 24 extending obliquely with respect to the longitudinal axis is thus formed. The angle of this ring surface relative to the longitudinal axis is preferably about 30°.

The edge 20 comprises in the present exemplary embodiment four recesses 26, 27, 28, 29 which are set uniformly apart from one another either in the circumferential direction and are also the same with regard to their extension in the circumferential direction. In the present exemplary embodiment, the recesses 26-29 each have an opening width of $\alpha 1$, wherein $\alpha 1$ is in the range of from 40-50°. The spacing between two adjacent recesses 26-29 is $\alpha 2$, in the present exemplary embodiment 90°. The closed portion of the edge 20 between two adjacent recesses 26-29 is in FIG. 1c denoted by $\alpha 3$ and is preferably about 45°.

The radial extension of the recesses is the same and denoted in FIG. 1c by h.

FIG. 1 also shows an especially configured ring seal 34 which lies at least partly in an annular groove 35 on the inside of the socket end 16 and extends inward in the radial direction. This seal is preferably made of EPDM (ethylene propylene terpolymer). The ring seal 34 will be described in greater detail below with reference to FIG. 3.

The spigot-and-socket joint 10 further includes a locking device 40 comprising two locking elements 42 and 44, both locking elements 42, 44 being embodied identically.

A locking element 42 or 44 consists of two ring segment-shaped locking parts 52, 54 which are joined together by a web 56. Overall, the two locking parts 52, 54 and the web 56 located therebetween form a ring segment-shaped component, as may clearly be seen for example in FIG. 1a.

Figure 2:
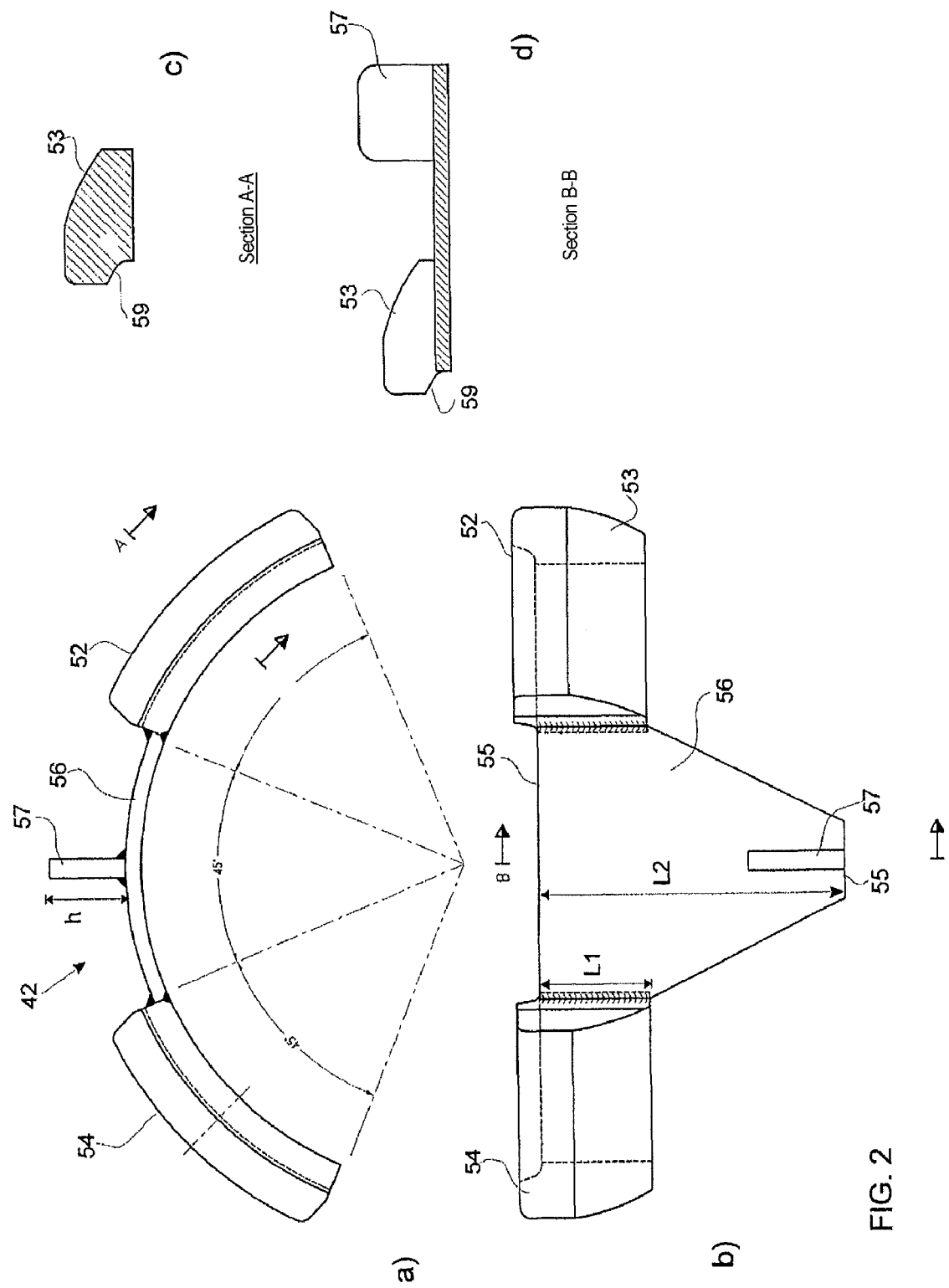
FIGS. 2a to d are various views of a locking element.

The precise construction of a locking element 42 is shown in FIG. 2. It may clearly be seen in this case that the two locking parts 52, 54 have an outer stop surface 53 extending obliquely to the longitudinal axis and a further stop surface 59 on the inside, i.e. facing the web 56. Both stop surfaces 53 and 59 are arranged diametrically, as may clearly be seen in FIG. 2c. The stop surface 59 is provided as a curved recess in order to be able to interact with a strip which is semicircular in cross section.

The outer stop surface 53 is, with regard to its slope, embodied so as to be able to interact with the oblique inner ring surface 24 of the socket end.

The web 56 has—viewed from above—a trapezium-like shape with two parallel sides 55. A lug 57, which extends in the radial direction and runs parallel to the longitudinal axis, is provided at the shorter side 55 of the web 56. The web 57 has a height h which is greater than the corresponding height of the two locking parts 52, 54.

From the plan view shown in FIG. 2b, it may also be seen that the length L2 of the web 56 is greater than the length L1 of the two locking parts 52, 54.

The locking element 42 can be formed in one piece or be assembled from a plurality of components. In FIG. 2, the locking element 42 has been produced, for example by welding, for example from the following individual parts: locking part 52, 54, web 56 and lug 57.

At this point, it should be recalled that the two locking elements 42, 44 are embodied identically to each other.

Finally, FIG. 2a also shows that the two locking parts 52, 54 extend over an angular range of approximately 45° and the web 56 also extends over approximately 45°. Overall, the locking element 42 should be configured in such a way that the angle of the web 56 is not less than $\alpha 3$ and the two angles of the locking parts 52 are not greater than $\alpha 1$, so that a locking element 42 can be inserted into two recesses 26-29; this will be described below in greater detail.

As may be seen from FIG. 1, the two locking elements 42, 44 rest against a spigot end 60 of a pipe 62. In other words, that means that the internal diameter of the locking elements 42, 44 corresponds approximately to the external diameter of the pipe 62. The extension of the two locking elements 42, 44 in the circumferential direction is in the present exemplary embodiment approximately 135°.

The spigot end 60 of the pipe 62 has a support strip 64 which extends, lying in a plane perpendicular to the longitudinal axis of the pipe, over an entire pipe circumference. Preferably, this support strip is embodied as a weld bead. This support strip 64 serves to increase the size of the external diameter of the spigot end 60. The external diameter of the support strip 64 and the internal diameter of the two locking elements 42, 44 have to be adapted to each other in such a way that the external diameter of the support strip exceeds the internal diameter of the locking elements by a predetermined value. As was briefly mentioned hereinbefore, the stop surface 59 of the locking parts 52, 54 is adapted to the shape of the support strip 64.

As may also be seen from FIG. 1b, the ring seal 34 completely surrounds the spigot end and outwardly seals an interior 70 of the socket end 16. In order to prevent the spigot end 60 from being able to be pulled back out of the socket end 16, the locking device 40 is inserted with the two locking elements 42, 44 into the socket end 16. In this case, the stop surface 53 of the locking parts rests against the likewise obliquely extending ring surface 24 of the edge 20. The support strip 64 rests against the rear surface 59, facing the interior 70, of the two locking elements 42, 44, as the external diameter of the support strip 64 is larger than the internal diameter of the locking elements 42, 44 resting on the spigot end. Thus, a tensile force acting in the longitudinal direction is accommodated by the edge 20 of the socket end 16 via the two locking elements 42, 44. The pipe 60 can therefore no longer be extracted. Owing to the four locking parts 52, 54, which are distributed uniformly in the circumferential direction, this tensile force is distributed uniformly over the cross section of the socket.

As may be seen from FIG. 1d, when locked, a locking element 44 is positioned in the socket end 16 in such a way that the web 56 is positioned in the region of a recess 27 and the two locking parts 52, 54 are positioned on the left and right of this recess.

FIG. 1d also shows the second locking element 42, although not in the locked position, but rather in the inserted position in which the two locking parts 52, 54 are positioned in the recesses 26, 29.

A retaining element 46, which, lying on the web, is introduced into the recess, is provided to prevent the locking elements 42, 44 from rotating, when locked, back into the inserted position and possibly even falling out. The retaining element 46 is supported against the facing edge 20, so that the locking element can no longer be rotated. The retaining element 46 is preferably made of a flexible and resilient material, for example EPDM, so that it can easily be inserted into the recess 27.

Figure 3A:
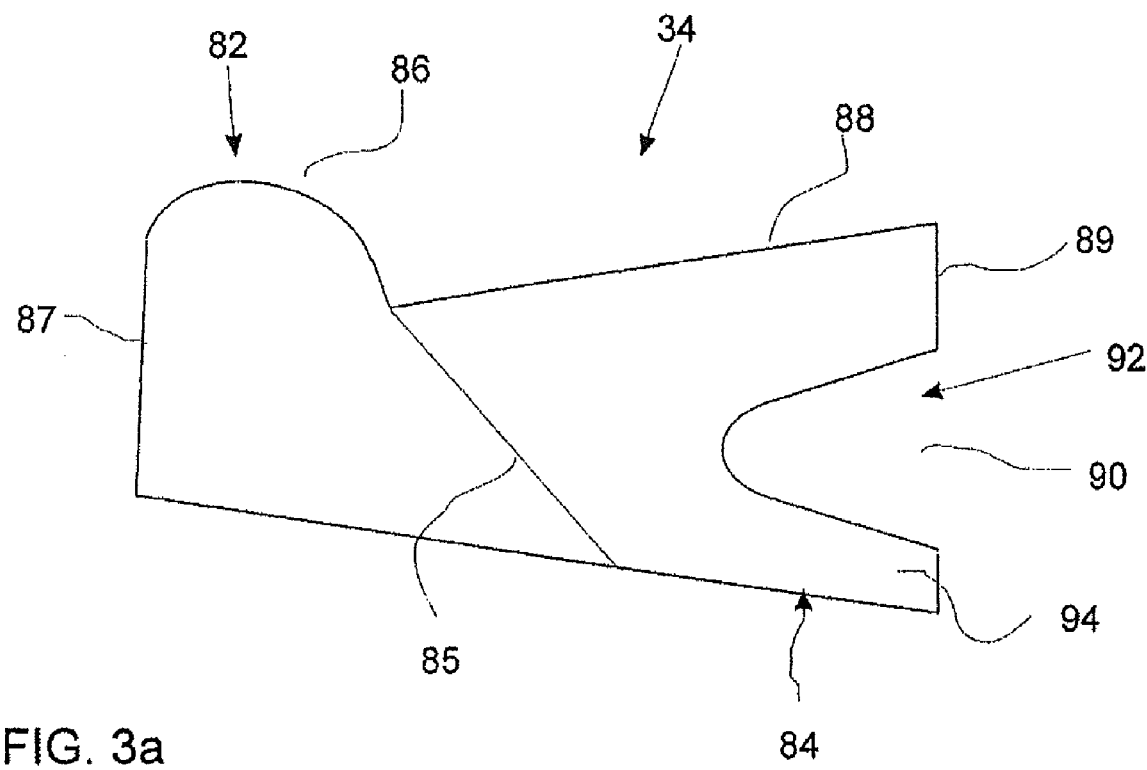
FIG. 3a is a schematic cross section of a first variant of a ring seal.

The ring seal 34 has in a first variant the cross-sectional shape shown in FIG. 3a. The ring seal 34 consists of two longitudinal portions 82, 84 forming a retaining part 82 and a sealing part 84. A possible dividing line between these two parts 82, 84 is illustrated schematically in FIG. 3 and denoted by reference numeral 85. Both parts 82, 84 can be made of different materials adapted to the function.

The retaining part 82 has a half-round outer surface 86 which merges toward one end with a straight end face 87. The sealing part 84 has an obliquely extending external outer surface 88 which merges at the other end of the ring seal with a radial end face 89.

The end face 89 of the sealing part 84 has an indentation 90, thus forming a dovetail shape in cross section. As a result, the inner portion 94 of the dovetail 92 is resilient in the radial direction in order in this way to allow an effective seal on the pipe 62. The large end face 87 of the sealing part 82 rests, when the ring seal 34 is inserted, against a corresponding ring surface of the socket end 16, the large surface allowing high pressures to be accommodated.

Figure 3B:
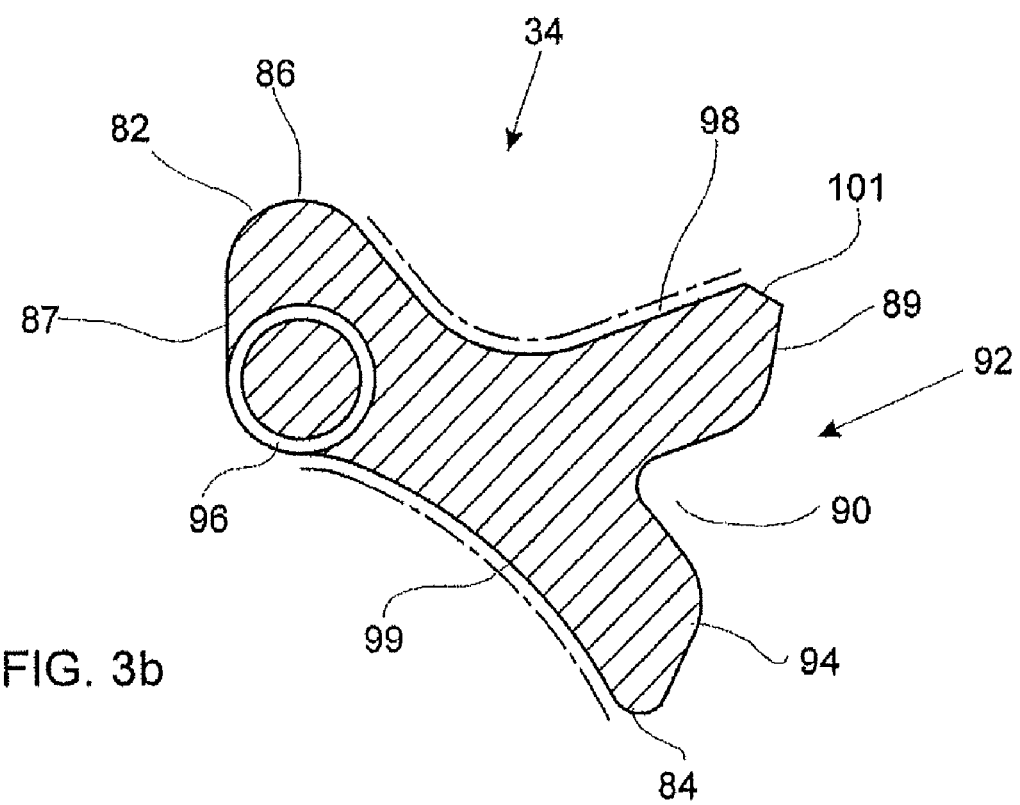
FIG. 3b is a cross section of a second variant of a ring seal.

FIG. 3b is a cross section of a second variant of the ring seal 34. This second variant of the ring seal 34 is particularly preferred, as it allows the necessary assembly forces to be significantly reduced compared to previous solutions and in addition tightness to be ensured even at external pressures of above 2 bar.

The precise geometry of this ring seal 34 may be seen from FIG. 3b and will be described—insofar as this is possible using words—hereinafter. The ring seal 34 has again a first longitudinal portion 82 and a second longitudinal portion 84, the second longitudinal portion 84 being embodied in a dovetailed manner and being denoted by reference numeral 92. FIG. 3b shows that the upper part of the dovetail 92 has a flattening 101. Otherwise, the surfaces of the dovetail 92 are embodied with roundings, so that only a few—if any—straight surfaces or rims are provided at transitions.

Again, a half-round, upwardly extending outer surface 86, which forms as it were a collar, is provided in the first longitudinal portion 82.

Compared to the solution shown in FIG. 3a, the two outer surfaces 98, 99, which extend from the first longitudinal portion to the second longitudinal portion, are embodied not in a straight manner, but rather in a concave manner, the concave arching running in all cases inward. This may be seen very clearly in FIG. 3b.

Finally, a spring 96, which extends annularly and ensures the necessary stability of the ring seal, is provided in the first longitudinal portion in the—viewed radially—lower region. This spring allows the ring seal 34 as a whole to be made of a single material having a Shore hardness of approximately 55. The ring seal 34 according to FIG. 3b therefore consists no longer of two different material components, namely a soft and a hard material.

Figure 4:
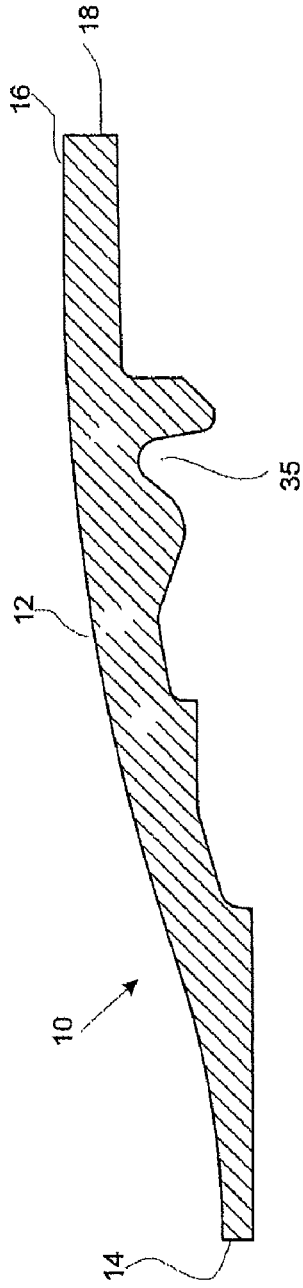
FIGS. 4a to e are a plurality of views of spigot-and-socket joints.
Figure 4:
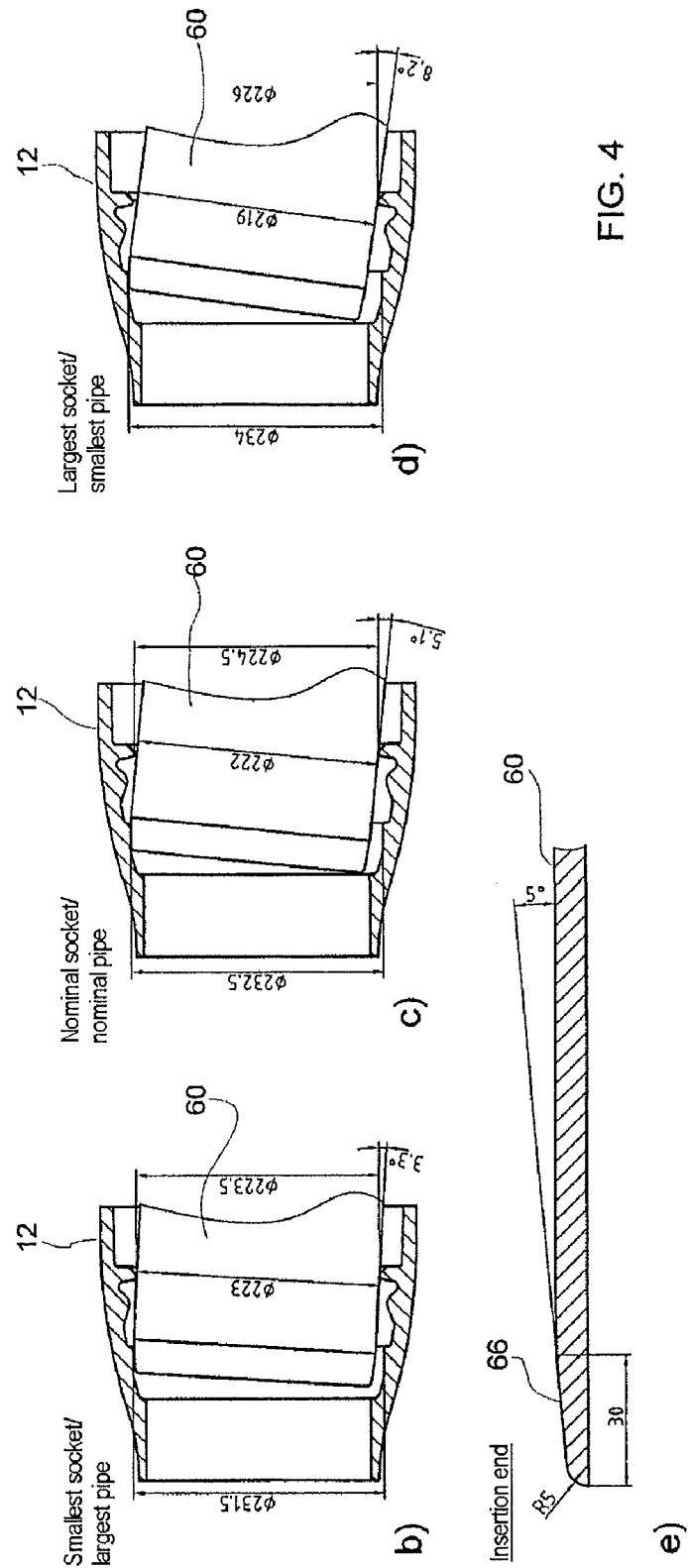

Finally, FIGS. 4a to e are again various views of the spigot-and-socket joint according to the invention, the degree of tiltability/bendability of the pipe, which is inserted into the socket piece 12, being shown in particular in FIGS. 4b to d. FIG. 4e is a cross section of a part of the spigot end 60, showing clearly that the end of this spigot end 60 has an inclined surface, thus producing a conical surface 66 which facilitates in particular the introduction of the spigot end into the socket piece.

The assembly of the spigot-and-socket joint 10 is carried out as follows:

Firstly, the interior of the socket end 16 is cleaned in order to be able subsequently to insert the ring seal 34 into the socket end. After appropriate cleaning of the spigot end 60, said spigot end is then introduced into the socket end 16 until it strikes against the socket base. During the introduction, the seal 34 nestles against the surface of the spigot end 60.

Subsequently, the first locking element 42 is inserted through the recesses 26, 29 in the axial direction and then displaced in the opposite direction, anticlockwise, in the circumferential direction until the lug 57 of the stop element 42 is positioned in the center of the recess 29.

Next, the second locking element 44 is inserted into the recesses 26, 27, so that the surface 53 is positioned after the surface 24 of the edge 20. Afterwards, the locking element 44 is displaced in the clockwise direction until the lug 57 is positioned in the center of the recess 27, as is shown in FIG. 1d.

As a result, the pipe 60 is already locked. However, in order to prevent the two locking elements 42, 44 from shifting back and possibly even falling out of the recess 26-29, the retaining element 46 is inserted into the recess 27 or 29 beyond the lug 57. The two retaining elements 46 thus ensure that the locking elements can no longer rotate.

It will be understood that modifications and alterations of the described locking device and the socket end 16 are conceivable without departing from the scope of the present invention.

What is claimed is:

1. A spigot-and-socket joint for connecting two pipes, pipe fittings or the like, having a longitudinal axis, comprising
    a socket end which is assigned to one pipe and into which a spigot end of the other pipe, which has a support strip, can be inserted, the socket end having a radially inward-protruding edge with at least one ring segment-shaped recess, and
    a locking device for locking the spigot end in the socket end, in that the support strip rests against the locking device and said locking device rests against the edge, the locking device comprising at least two ring segment-shaped locking elements,
    wherein
    at least four recesses are provided in the edge and are arranged with uniform spacing in the circumferential direction,
    wherein the two locking elements each have two ring segment-shaped locking parts which are joined together via a respective web, the spacing between the two locking parts of each locking element corresponding to the spacing between two of the recesses, and further wherein the retaining element lies parallel to the web between the two locking parts and rests against the edge and thus prevents rotation of the locking element in the socket end.

2. The spigot-and-socket joint as claimed in claim 1, wherein the web extends in the direction of the longitudinal axis and has at its end a lug which extends in the radial direction and lies parallel to the longitudinal axis, the lug being—when the locking parts are inserted—outside the socket end.

3. The spigot-and-socket joint as claimed in claim 1, wherein the retaining element is made of a plastics material, preferably EPDM.

4. The spigot-and-socket joint as claimed in claim 1, wherein the locking elements are made of metal, preferably a ductile cast iron, or a pressure-resistant plastics material.

5. The spigot-and-socket joint as claimed in claim 3, wherein the retaining element conforms to the shape of the web and can be introduced into the recess beyond the lug.

6. The spigot-and-socket joint as claimed in claim 1, wherein the socket end has on its inside a semicircular groove encircling in the circumferential direction and a circumferential surface which adjoins said groove and runs obliquely to the longitudinal axis, the groove and the circumferential surface being provided to receive a correspondingly embodied ring seal.

7. The spigot-and-socket joint as claimed in claim 6, wherein the ring seal has a first longitudinal portion, which has an outwardly rounded (convex) surface, and has a second longitudinal portion which is embodied in a dovetailed manner, the first longitudinal portion serving as the retaining part and the second longitudinal portion as the sealing part.

8. The spigot-and-socket joint as claimed in claim 7, wherein both the outwardly pointing and the inwardly pointing surface of the ring seal have—viewed in longitudinal section—a concave shape.

9. The spigot-and-socket joint as claimed in claim 6, wherein the ring seal has a spring running in the circumferential direction in the region of the first longitudinal portion.

10. The spigot-and-socket joint as claimed in claim 9, wherein the spring is vulcanized into the ring seal.

11. The spigot-and-socket joint as claimed in claim 1, wherein the edge has a beveled inner ring surface, the angle between the ring surface and longitudinal axis of the socket end being approximately 30°.

12. A ring seal in combination with a spigot-and-socket joint for connecting two pipes, pipe fittings or the like, comprising a socket end which is assigned to one pipe and into which a spigot end of the other pipe, which has a support strip, can be inserted, the socket end having a radially inward-protruding edge with at least one ring segment-shaped recess, and a locking device for locking the spigot end in the socket end, in that the support strip rests against the locking device and said locking device rests against the edge, the locking device comprising at least two ring segment-shaped locking elements, wherein at least four recesses are provided in the edge and are arranged with uniform spacing in the circumferential direction, and the two locking elements each have two ring segment-shaped locking parts which are joined together via a respective web, the spacing between the two locking parts of each locking element corresponding to the spacing between two of the recesses, wherein a longitudinal end of the ring seal is embodied in a dovetailed manner and the opposing other longitudinal end has an outwardly extending collar, and in that the outer and inner surfaces, which connect the two longitudinal ends, are—in longitudinal section—embodied in a concave manner, wherein a retaining element is assigned to each locking element, wherein the retaining element lies parallel to the web between the two locking parts and rests against the edge and thus prevents rotation of the locking element in the socket end.

13. The ring seal and joint combination as claimed in claim 12, wherein a spring, which extends in the circumferential direction, is provided in the other longitudinal end.

14. The ring seal and joint combination as claimed in claim 13, wherein the external end part of the dovetail is—in longitudinal section—configured in a flattened manner.

15. The ring seal and joint combination as claimed in claim 12, wherein the external end part of the dovetail is—in longitudinal section—configured in a flattened manner.

16. A spigot-and-socket joint for connecting two pipes, pipe fittings or the like, having a longitudinal axis, comprising:
a socket end which is assigned to one pipe and into which a spigot end of the other pipe, which has a support strip, can be inserted, the socket end having a radially inward-protruding edge with at least one ring segment-shaped recess, and
a locking device for locking the spigot end in the socket end, in that the support strip rests against the locking device and said locking device rests against the edge, the locking device comprising at least two ring segment-shaped locking elements,
wherein at least four recesses are provided in the edge and are arranged with uniform spacing in the circumferential direction, and
wherein the two locking elements each have two ring segment-shaped locking parts which are joined together via a respective web, the spacing between the two locking parts of each locking element corresponding to the spacing between two of the recesses,
wherein the web extends in the direction of the longitudinal axis and has at its end a lug which extends in the radial direction and lies parallel to the longitudinal axis, the lug being, when the locking parts are inserted, outside the socket end; and further
wherein a retaining element is assigned to each locking element and the retaining element conforms to the shape of the web and can be introduced into the recess beyond the lug.

* * * * *

UNITED STATES PATENT AND TRADEMARK OFFICE
CERTIFICATE OF CORRECTION

PATENT NO. : 7,806,445 B2  Page 1 of 1
APPLICATION NO. : 12/336793
DATED : October 5, 2010
INVENTOR(S) : Hermann Mutschlechner et al.

It is certified that error appears in the above-identified patent and that said Letters Patent is hereby corrected as shown below:

Column 8,

Line 67, delete "(convex)".

Column 10,

Line 29, delete "and".

Signed and Sealed this

Twenty-first Day of December, 2010

David J. Kappos
*Director of the United States Patent and Trademark Office*